W. T. RICHARDS.
Making Wire Ferrules.

No. 9,369.

Patented Nov. 2, 1852.

UNITED STATES PATENT OFFICE.

WILLIAM T. RICHARDS, OF NEW HAVEN, CONNECTICUT.

MANUFACTURE OF WIRE FERRULES.

Specification of Letters Patent No. 9,369, dated November 2, 1852.

*To all whom it may concern:*

Be it known that I, WILLIAM T. RICHARDS, of the city and county of New Haven, in the State of Connecticut, have invented a new and useful Improvement in the Manufacture of Wire Ferrules for Tool-Handles, &c.; and I do hereby declare that the following is a full, clear, and exact description of the construction and character of the same, reference being had to the accompanying drawings, which make a part of this specification, in which—

Figure 1:
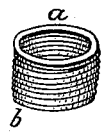
Figure 2:
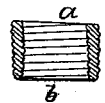

Figure 1, is a perspective view of a wire ferrule ready to be put onto a handle. Fig. 2, is a longitudinal section of the same.

My improvement consists in so manufacturing the wire ferrule that both ends of it may be smooth, true, and at right angles to its length.

I make the ferrules of iron wire by coiling it in a helical shape, in the usual, or any other, way, and cutting the ferrule off, of the proper length, in such a manner as to bevel, or scarf, the ends of the wire to such a degree that, when it runs to a point, as seen at *a*, and *b*, Figs. 1, and 2, the ends of the ferrule will be perfectly flat, true, or square across, at right angles to the length of the coil, so that the ferrule may fit perfectly snug to the shoulder of the handle, while the outer end will be true with the end of the wood, (or other material,) of the handle.

I cut the coil by means of suitable machinery, such as my machine for making wire ferrules, patented the fourteenth day of September 1852; or any other proper machine. When the coil is thus cut into the proper lengths, I tin, and solder, them in the usual, (or any other,) way of tinning and soldering iron wire, when they are ready for use, as seen in Fig. 1, the ferrule needing no other finishing.

The advantages of my improvement consist in the making the ferrules perfectly smooth and straight on both ends, so that the two will be perfectly parallel to each other and at right angles to the length of the coil, so that they may be run onto the rabbet on the end of the handle, in the form of a female screw, snug up to the shoulder so as to make a perfect fit, and there be secure against any liability to become loose, and so that they cannot slip. And in that the ends of the wire being beveled to a point and soldered close, so that there is no purchase, or leverage, the ferrules will have many times the strength of any other ferrules heretofore used, even when made of wire with the ends cut off directly across the wire, as I have heretofore made them.

I am aware that wire ferrules have been made when the coil has been cut directly across the wire. I, therefore, do not claim the manufacture of wire ferrules, as such, as my invention, but

What I claim as my invention, and desire to secure by Letters Patent, is—

The manufacture of ferrules from iron wire by cutting them from a helical coil in such a manner that both ends of each ferrule will be perfectly smooth, true, and square across, at right angles to the length, so that no other finishing of the ends will be needed to render them fit for use, and so that, when soldered, they will be the most convenient and durable ferrules which can be made, when manufactured in the manner, substantially as described.

WM. T. RICHARDS.

Witnesses:
S. RANSOM,
R. FITZGERALD.